United States Patent

Nakamura

[11] Patent Number: 5,954,159
[45] Date of Patent: Sep. 21, 1999

[54] OIL SUPPLY STRUCTURE FOR A CHAIN ADJUSTER

[75] Inventor: Makoto Nakamura, Hamamatsu, Japan

[73] Assignee: Suzuki Motor Corporation, Shizuoka-ken, Japan

[21] Appl. No.: 08/955,493

[22] Filed: Oct. 22, 1997

[30] Foreign Application Priority Data

Dec. 20, 1996 [JP] Japan .................................. 8-341123

[51] Int. Cl.$^6$ ....................................................... F16H 7/08
[52] U.S. Cl. ........................ 184/11.2; 184/15.1; 474/110
[58] Field of Search ................................. 184/11.2, 15.1; 74/606 R; 123/90.17, 90.31, 90.33, 90.34; 474/110, 111

[56] References Cited

U.S. PATENT DOCUMENTS

| | | | |
|---|---|---|---|
| 4,543,079 | 9/1985 | Matsuda et al. | 474/110 |
| 5,277,664 | 1/1994 | Mott | 474/110 |
| 5,713,809 | 2/1998 | Yamamoto et al. | 474/110 |
| 5,730,673 | 3/1998 | Schnupke et al. | 474/111 |
| 5,797,817 | 8/1998 | Senftleben et al. | 474/110 |

FOREIGN PATENT DOCUMENTS 3816864  11/1989  Germany ......................... 123/196 CP

*Primary Examiner*—Lenard A. Footland
*Assistant Examiner*—Chong H. Kim
*Attorney, Agent, or Firm*—Nath & Associates; Gary M. Nath; Harold L. Novick

[57] ABSTRACT

Approximately U-letter-shaped oil groove 42 is formed by casting on the surface 35*a* of the pedestal 35, the depth of the groove is deeper than the surface of the cylinder block 2, one leg of the U-letter shaped groove 42 is formed as a reservation chamber 44 and the other leg of the groove 42 is in communication with an oil passage 36 provided in the cylinder block 2, and the driving part block 8 of the chain adjuster 5 is coupled to the surface 35*a* of the pedestal 35 in such a manner as the oil hole 39 of the driving part block 8 is aligned with the oil reservation chamber 44. When the internal combustion engine starts, the oil flows into the reservation chamber over the partition wall to supply the oil to the chain adjuster. When the engine stopped, since the oil is deposited in the oil reservation chamber 44, it can be used instantly at the time of re-starting of the engine.

2 Claims, 6 Drawing Sheets

OIL SUPPLY STRUCTURE FOR A CHAIN ADJUSTER

BACKGROUND OF THE INVENTION

1. Field of the Invention

This invention relates to an oil supply structure for a chain adjuster for supporting a timing chain, with which moving portions such as crankshaft and timing chain are put for synchronizing a timing of a valve's opening and closing in an internal combustion engine used for vehicles, autocyles and outboard motors.

2. Description of the Related Art

Conventionally, a timing chain provided in an internal combustion engine of vehicle is provided with a chain adjuster for maintaining the tensile strength. As shown in FIG. 9, a timing chain 1 is put between a crankshaft 3 and a camshaft 4, and the outer circumference of the chain formed in loop is in contact with a curved-shaped pressure plate 6 as an operating part of the chain adjuster 5.

One end of the pressure plate 6 is pivoted on a cylinder block with a bolt 7, and the other end thereof contacts to a rod 10 biased by a spring 9 of a driving part block 8 of the chain adjuster 5, as a result, the pressure plate 6 is pressed against the timing chain 1.

The driving part block 8 of the chain adjuster 5 is, as shown in FIG. 10, adapted to be connected with a bolt 12 (FIG. 9) to a connection plane 11 formed on a projection from the surface of the cylinder block 2, and at the connection position (connection plane 11) a concave reservation chamber 13 is formed, from which an oil passage 14 is formed toward the deep portion of the block crosswise. And, the reservation chamber 13 and the oil passage 14 are in communication with each other through a pouring hole 15. Further, as shown in FIG. 11, since a tip end of the oil passage 14 is opened through the side surface, it is sealed with a plug 16.

The rod 10 of the thus-constructed chain adjuster 5 is extended due to the pressing force of the spring 9 of the driving part block 8, which presses the pressure plate 6 while being regulated by the pressure of the oil supplied, which, as a result, causes the tensile strength of the timing chain 1 to become appropriate (referring to Japanese Utility Model Laid-open No. Sho 57-71711). Further, oil passages provided for being in communication among an oil pump and the camshaft and valves are formed (referring to Japanese Utility Model Laid-open No. Sho 61-147312).

However, in such a construction as fastening the driving part block 8 of the chain adjuster 5 to the position of the cylinder block 2 where the reservation chamber 13 is fitted by the bolts, when forming the oil passage 14 while crossing the cylinder block 2, the oil passage 14 has to be provided in the vicinity of the surface of the cylinder block 2. Therefore, since the end portion of the oil passage 14 is opened toward the side, the opening of the passage 14 has to be sealed using a plug 16, so that the number of working processes has been increased, which causes the manufacturing cost to be increased.

SUMMARY OF THE INVENTION

An object of the present invention is to provide a structure for supplying oil to a chain adjuster, in which the chain adjuster is easily mounted and the oil supply is carried out smoothly.

In order to attain the above object, the present invention is characterized in that, in a driving part block of a chain adjuster comprising an operating part and a driving part block, an oil supply hole is provided on the driving part block, a pedestal having an approximately U-letter-shaped oil groove on the surface, above which a timing chain is located, is formed on the cylinder block, one leg portion of the U-letter shaped groove is formed as a reservation chamber, and the other leg portion of the groove is in communication with an oil passage for use of the adjuster, wherein, when the driving part block is mounted to the pedestal, the oil supply hole becomes aligned with the reservation chamber.

Further, it is characterized also in that, the depth of the U-letter shaped oil groove is formed deeper at least at the other leg portion of the groove than the surface of the cylinder block, and that said oil passage is in communication with a passage formed on the circumferential surface of a crank journal.

The chain adjuster of the present invention is adapted to maintain the tensile strength for avoiding the chain from being loosened, and the pressure plate (operating part) to be pressed against the timing chain and the rod (driving part) biased with the spring to drive the pressure plate are provided, and that the driving part block to support the driving part is provided with the oil supply hole. And, when the driving part block is mounted to the cylinder block, the oil supply hole is made aligned with the reservation chamber of the cylinder block. Accordingly, the present invention can be applied to any similar chain adjuster if it is similar in the functions of its operating part and driving part.

DESCRIPTION OF PREFERRED EMBODIMENT

Figure 8:
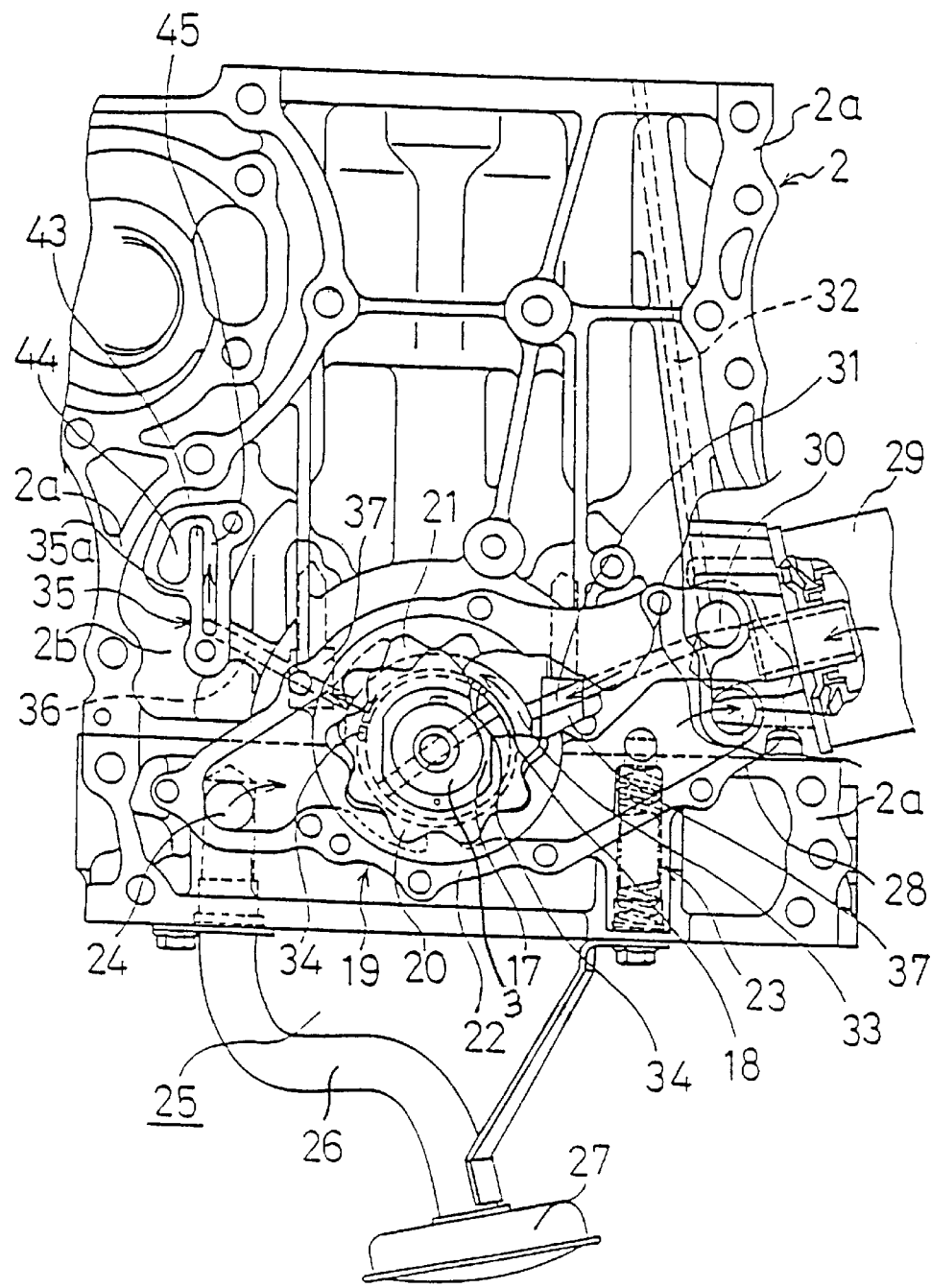
FIG. 8 is a front view showing an outline of the cylinder block shown in FIG. 1.

Hereinafter an embodiment of the present invention will be described with reference to the attached drawings. First, as shown in FIG. 8, a crankshaft 3 is protruded from a cylinder block 2 which is supported by a crank journal 17 and a journal metal 18, and at the tip end thereof an inner rotor 20 and an outer rotor 21 of an oil pump 19 are provided. And, surrounding them an oil pump body 22 is provided. On the oil pump 19, a release valve 23 is provided, and further from an oil suction inlet 24 a pipe 26 is extended toward an oil pan 25 and to the tip end thereof an oil strainer 27 is connected. An outlet of the oil pump 19 is connected to an oil filter 29 through a sub gallery 28, and an output side of an oil filter 29 is connected to the passage 31 communicated with a journal provided in the cylinder block 2 and to the passage 32 communicated to a cylinder head through a main gallery 30. The oil passage 31 of the journal side is also in communication with a passage 33 located at a back side of the journal metal 18. Further, the journal metal 18 is provided with an oil hole 34 pierced radially. As a result, oil circulates around the inner and outer circumferences of the journal 18, which are used as oil passages.

On the other hand, slantwise above the journal metal 18, a pedestal 35 protruded from the surface of the cylinder block 2 is provided, and is connected with an oil passage 36 upper inclined and extended from the outer circumference of the journal metal 18 toward the pedestal 35. Incidentally, if, on the way of the oil passages 31 and 36, bolt depressions 37, 37 are crossed with them, the depressions can be used as oil passages.

Figure 1:
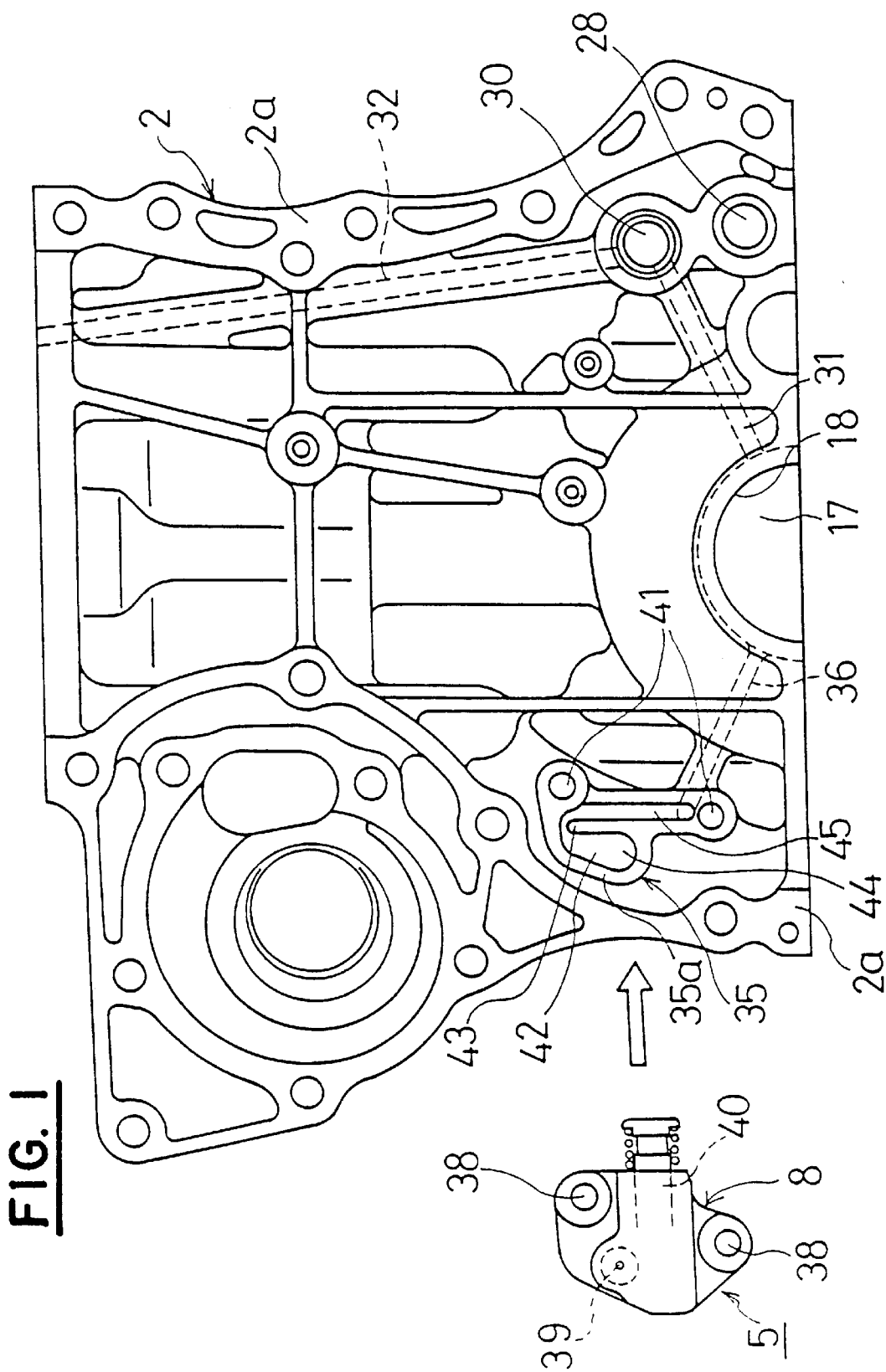
FIG. 1 is a front view of a main portion of an oil supply structure for a chain adjuster according to an embodiment of the present invention.

In addition, a chain cover (not shown) of the cylinder block 2 comprises a covering portion (not shown) for the oil pump body 22, and a mounting surface 2a of the cylinder block 2 to mount the chain cover thereon is adapted to be located at the height protruded from the surface 2b of the cylinder block 2, which is located at the same height to the mounting surface 35a of the pedestal 35 to mount the driving part block 8 of the chain adjuster 5 shown in FIG. 1.

Figure 9:
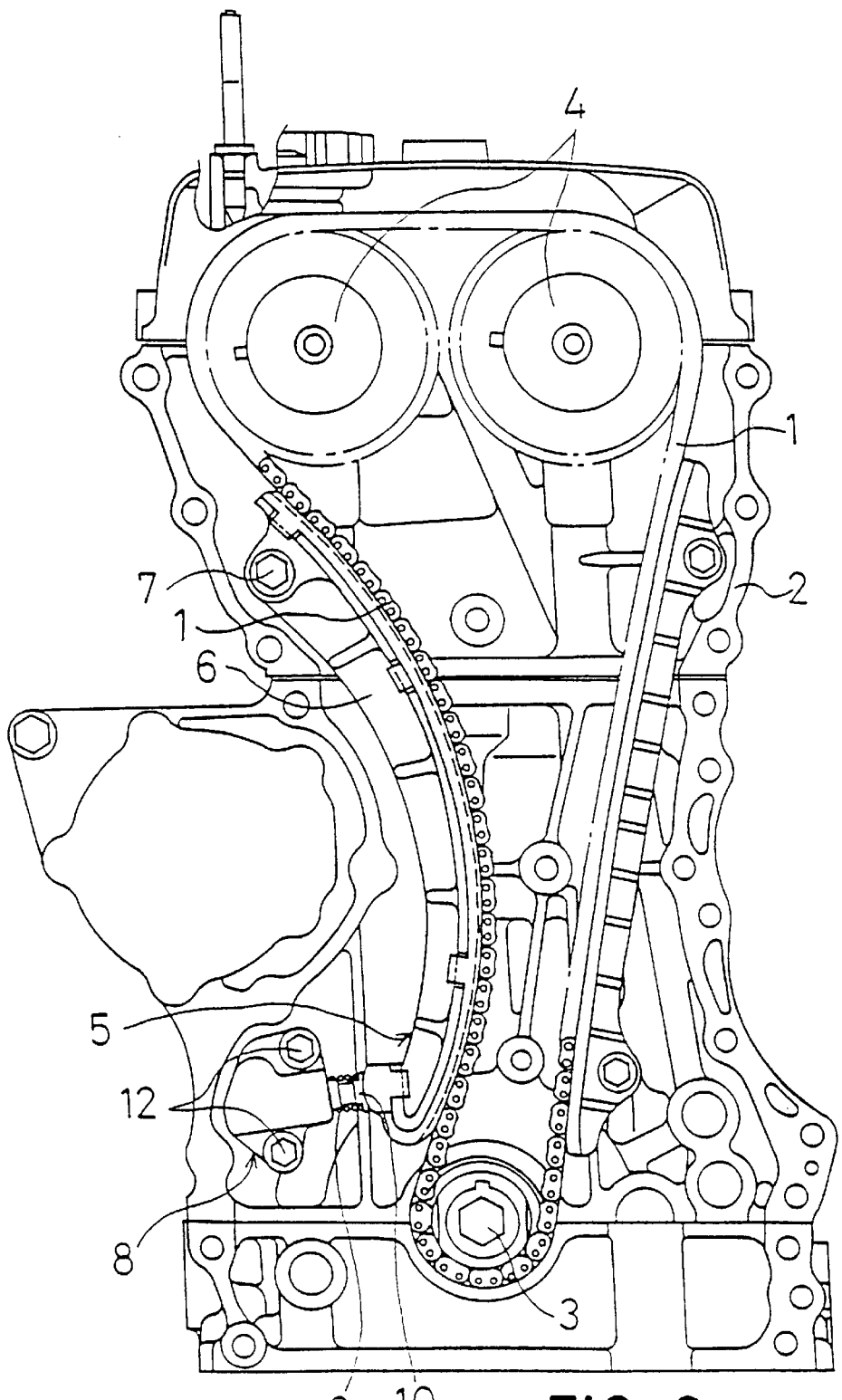
FIG. 9 shows a conventional cylinder block as a whole.
Figure 10:
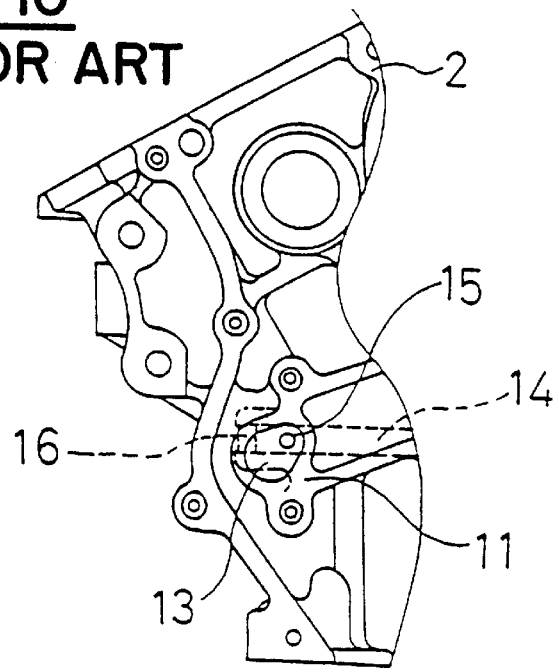
FIG. 10 is a front view of a main portion of an oil supply structure for a chain adjuster shown in FIG. 9.
Figure 11:
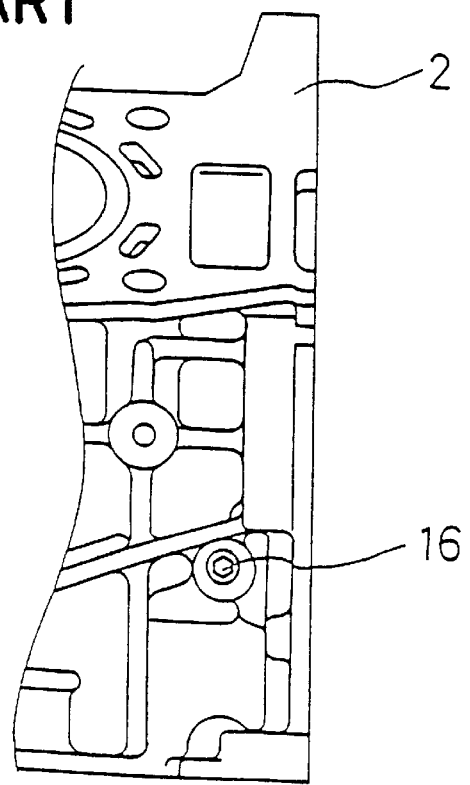
FIG. 11 is a side view of the oil supply structure shown in FIG. 10.

The driving part block 8 is provided with, as shown in FIGS. 1, 5–7, a pair of mounting holes 38 are provided and a mounting surface 8a is provided with an oil supply hole 39 by being pierced for supplying oil to a rush adjuster 40 in the block. Further, a rod 10 is provided in such a manner as it expands and contracts elastically by being biased by the spring 9 (expanded by stroke a) and has a pressure plate 6 to press on the timing chain 1 to regulate the tensile strength of the chain (FIG. 9). And, the rush adjuster 40 is adapted to absorb a reaction of the timing chain 1 due to its vibration.

Figure 2:
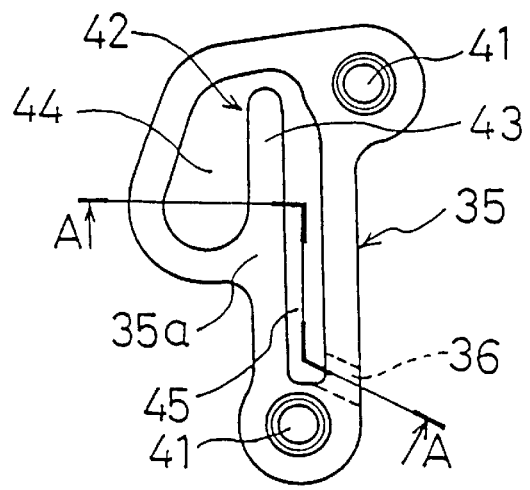
FIG. 2 is a front view of a pedestal formed on the cylinder block shown in FIG. 1.
Figure 3:
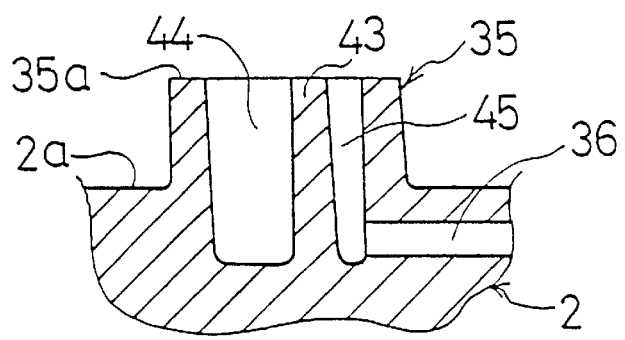
FIG. 3 shows a sectional view of A—A side of the pedestal shown in FIG. 2.
Figure 4:
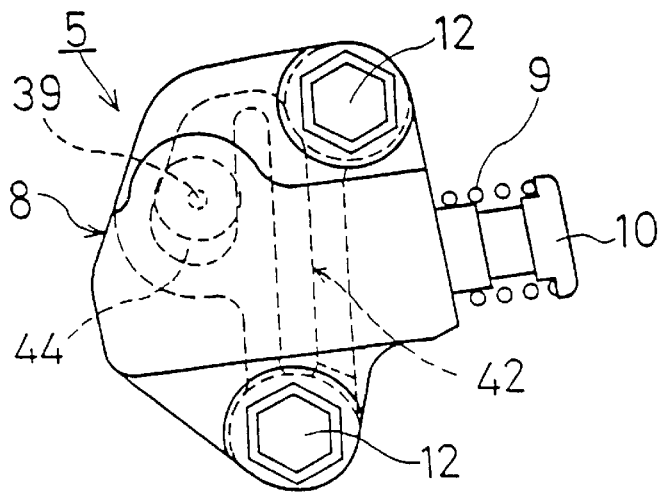
FIG. 4 is a plan view of a driving part block showing the position relation to the pedestal shown in FIG. 2.
Figure 5:
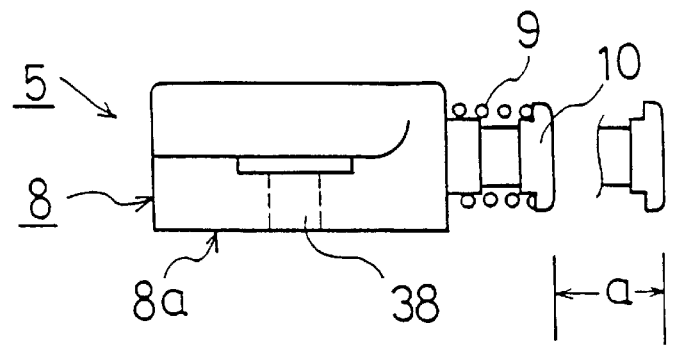
FIG. 5 is a side view of the driving part block shown in FIG. 4.
Figure 6:
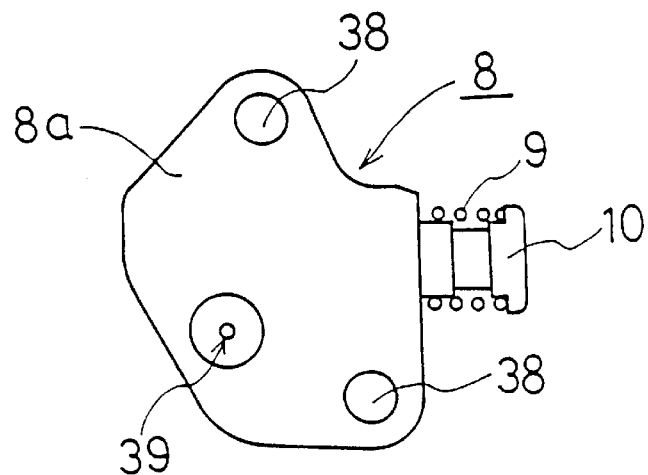
FIG. 6 is a bottom view of the driving part block shown in FIG. 4.
Figure 7:
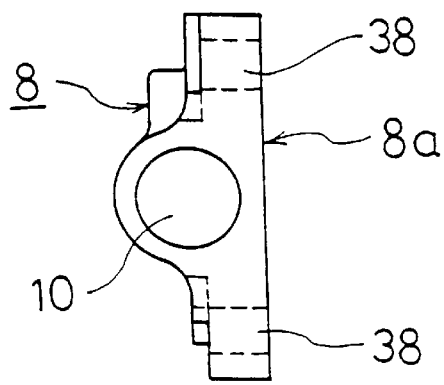
FIG. 7 is a side view of the driving part block shown in FIG. 4.

As shown in FIGS. 2 and 3, the pedestal 35 is provided with a pair of screw holes 41 for mounting the driving part block 8, on the surface 35a of the pedestal 35 an approximately U-letter shaped groove 42 is formed, and one leg portion of the U-letter groove formed by interposing a partition wall 43 is widened in its width to form a reservation chamber 44 and the length of the other leg portion of the U-letter groove 42 is made longer than the one of the reservation chamber 44 to form an oil passing portion 45 which is in communication with the reservation chamber 44 only at the portion near to the surface 35a of the pedestal 35. The depth of the groove 42 is formed in such a manner as, at least at the oil passing portion 45 of the groove 42, it is made deeper than the surface 2b of the cylinder block, and the oil passage 36 extended from the journal side is formed inside the cylinder block 2 and opened to the below end of the wall face of the oil passing portion 45. Accordingly, when the driving part block 8 is assembled to the pedestal 35, the oil supply hole 39, as shown in FIG. 4, becomes in aligned with the oil reservation chamber 44.

Next, how the driving part block 8 to be supplied with the oil is explained. During operation of an internal combustion engine, the oil enters from the oil suction 24 into the oil pump body 22 and from where it is supplied to the oil passage 31 through the oil filter 29 by the oil pump 19. Then, from the oil passage 31 the oil flows into the oil passage 36 upwardly inclined toward the pedestal 35 through the depressions 37 and the oil hole 34 of the journal metal 18.

The oil supplied to the below portion of the oil passing portion 45 increases its volume in the oil passing portion 45 and the height of the volume inside the oil passing portion 45, and crosses over the partition wall 43, pours into the reservation chamber 44 and eventually enters into the driving part block 8 through the oil supply hole 39 to be poured to the rush adjuster 40. Thereby, the operation of the chain adjusting can be carried out smoothly.

When the internal combustion engine stopped, since the pressure of the oil pump 19 is lost, the level of the oil filled in the oil passing portion 45 will be lowered and as a result the oil will be deposited in the oil reservation chamber 44. Accordingly, initially at the re-starting the deposited oil flows to the driving part block 8 to lubricate it. Thereby, the time interval necessary to initiate lubrication to the chain adjuster will be shortened, so that the function of the chain adjuster is improved to be able to reduce the noise and exhaust gas of the internal combustion engine.

Further, since the oil is supplied from the main gallery 30 through the crank journal 17, a leak from this passage is promoted, the oil pressure in the rush adjuster 40 of the driving part block 8 is adapted to be controlled for avoiding it from becoming too high. In addition, since the air entered into the U-letter shaped groove 42 formed on the pedestal 35 from the oil passage 36 is settled on upper area of the groove 42 and does not mix with the oil in the oil reservation chamber, the air becomes difficult to enter the rush adjuster 40 and the tensile strength regulation of the timing chain comes to be carried out smoothly.

Other than the above, at the time of manufacturing the cylinder block 2, since the depth of the U-letter shaped groove 42 is formed in such a manner as it becomes deeper than the surface 2b of the cylinder block 2 and the oil passage 36 is formed in the cylinder block 2 upward inclined, it comes to be easy to make the groove 42 communicate with the oil passage 36. And, a plug to be used in the conventional oil passage becomes unnecessary, which causes the number of working processes and the number of necessary parts to be reduced, as a result, the part to be lightened and the manufacturing cost to be reduced.

The present invention is thus constructed and since the reservation chamber formed on the pedestal for mounting the driving part block of the chain adjuster deposits the oil even after stopping of the internal combustion engine, the interval for supplying the oil to the chain adjuster at the time of re-starting of the engine is shortened, so that the noise and exhaust gas can be reduced. Further, by casting the oil passages toward the reservation chamber can be prepared, so that compared to the conventional art the number of parts and the weight of the part can be reduced to save the manufacturing cost.

What is claimed is:

1. An oil supply structure for a chain adjuster which is provided with an operating part and a driving part block comprising;

a cylinder block having a surface and a timing chain side;

a pedestal being formed on said surface of said cylinder block on said timing chain side;

said pedestal having an approximately U-letter-shaped oil groove;

said U-letter-shaped oil groove having two leas forming a U-letter-shape and being formed deeper than said surface of said cylinder blocks;

a reservation chamber being formed in one lea of said U-letter-shaped oil groove;

an oil passage being communicated with the other leg of said U-letter-shaped oil groove;

said driving part block having an oil supply hole and being mounted to said pedestal so as to align said oil supply hole with said reservation chamber.

2. An oil supply structure for a chain adjuster according to the claim 1, wherein a passage formed around the circumference of a crank journal is in communication with the oil passage.

* * * * *

UNITED STATES PATENT AND TRADEMARK OFFICE
CERTIFICATE OF CORRECTION

PATENT NO. : 5,954,159
DATED : September 21, 1999
INVENTOR(S) : Makoto NAKAMURA

It is certified that error appears in the above-identified patent and that said Letters Patent is hereby corrected as shown below:

Column 4, Claim 1, Line 51, replace "leas" with

--legs--

Column 4, Claim 1, Line 53, replace "blocks"

--block--

Column 4, Claim 1, Line 55, replace "lea"

--leg--

Signed and Sealed this

Ninth Day of May, 2000

*Attest:*

Q. TODD DICKINSON

*Attesting Officer*     *Director of Patents and Trademarks*